US012585117B2

(12) United States Patent　　　(10) Patent No.:　US 12,585,117 B2
Valera et al.　　　　　　　　　　　(45) Date of Patent:　　　Mar. 24, 2026

(54) WAVEGUIDE FOR AUGMENTED REALITY OR VIRTUAL REALITY DISPLAY

(71) Applicant: Snap Inc., Santa Monica, CA (US)

(72) Inventors: Mohmed Salim Valera, Sutton Coldfield (GB); Christian William Olavi Sol, London (GB)

(73) Assignee: Snap Inc., Santa Monica, CA (US)

( * ) Notice: Subject to any disclaimer, the term of this patent is extended or adjusted under 35 U.S.C. 154(b) by 287 days.

(21) Appl. No.: 18/257,232

(22) PCT Filed: Dec. 7, 2021

(86) PCT No.: PCT/EP2021/084662
§ 371 (c)(1),
(2) Date: Jun. 13, 2023

(87) PCT Pub. No.: WO2022/135918
PCT Pub. Date: Jun. 30, 2022

(65) Prior Publication Data
US 2024/0045205 A1　　Feb. 8, 2024

(30) Foreign Application Priority Data

Dec. 23, 2020　(EP) .................................... 20216922

(51) Int. Cl.
*G02B 27/01*　　　(2006.01)
*G02B 6/122*　　　(2006.01)
(Continued)

(52) U.S. Cl.
CPC ....... *G02B 27/0172* (2013.01); *G02B 6/1225* (2013.01); *G02B 27/0101* (2013.01); (Continued)

(58) Field of Classification Search
CPC .............. G02B 27/017; G02B 27/0172; G02B 6/1225; G02B 1/005
See application file for complete search history.

(56) References Cited

U.S. PATENT DOCUMENTS 10,962,787 B1 *　3/2021　Lou ...................... G02B 6/0036
2010/0284085 A1　11/2010　Laakkonen
(Continued)

FOREIGN PATENT DOCUMENTS

CN　　101512413　　8/2009
CN　　108139589　　6/2018
(Continued)

OTHER PUBLICATIONS

First Office Action in Chinese application 202180087158.5 with English translation, dated Dec. 27, 2025. (Year: 2025).*
(Continued)

*Primary Examiner* — Michael Stahl
(74) *Attorney, Agent, or Firm* — Schwegman Lundberg & Woessner, P.A.

(57) ABSTRACT

A waveguide for use in an augmented reality or virtual reality display comprises a plurality of optical structures in or on a photonic crystal. The plurality of optical structures are arranged in an array to provide two diffractive optical elements overlaid on one another in the waveguide. Each of the two diffractive optical elements is configured to receive light from an input direction and couple it towards the other diffractive optical element which can then act as an output diffractive optical element, providing outcoupled orders towards a viewer. The plurality of optical structures have different respective cross sectional shapes, for a cross section parallel to the plane of the waveguide, at different positions in the array in order to provide different diffraction efficiencies at different positions in the array.

20 Claims, 11 Drawing Sheets

(51) Int. Cl.
    *G06F 9/54* (2006.01)
    *H04M 1/72406* (2021.01)
(52) U.S. Cl.
    CPC .......... *G06F 9/54* (2013.01); *H04M 1/72406* (2021.01); *G02B 2027/0118* (2013.01)

(56) References Cited

U.S. PATENT DOCUMENTS

| | | | | |
|---|---|---|---|---|
| 2012/0044572 A1* | 2/2012 | Simmonds | ........... | G02B 6/0061 |
| | | | | 385/37 |
| 2018/0143485 A1 | 5/2018 | Oh | | |
| 2018/0180793 A1 | 6/2018 | Fattal | | |
| 2018/0210205 A1* | 7/2018 | Grey | ................. | G02B 27/4272 |
| 2020/0110261 A1 | 4/2020 | Grey et al. | | |
| 2020/0241295 A1 | 7/2020 | Fattal | | |
| 2020/0264367 A1* | 8/2020 | Huang | ............... | G02B 27/0081 |
| 2021/0382308 A1* | 12/2021 | Phelan | ............... | G02B 27/0081 |
| 2024/0103212 A1* | 3/2024 | Jarvenpaa | ............ | G02B 6/0076 |

FOREIGN PATENT DOCUMENTS

| | | | |
|---|---|---|---|
| CN | 110192146 | | 8/2019 |
| CN | 111194422 | | 5/2020 |
| CN | 111279123 A | * | 6/2020 |
| CN | 116670546 A | | 8/2023 |
| EP | 4267998 A1 | | 11/2023 |
| KR | 20230118552 A | | 8/2023 |
| WO | WO 2016/020643 A1 | * | 2/2016 |
| WO | WO 2018/091862 A1 | * | 5/2018 |
| WO | WO-2018178626 A1 | | 10/2018 |
| WO | WO-2022135918 A1 | | 6/2022 |

OTHER PUBLICATIONS

"International Application Serial No. PCT/EP2021/084662, International Search Report mailed Feb. 1, 2022", 4 pgs.

"International Application Serial No. PCT/EP2021/084662, Written Opinion mailed Feb. 1, 2022", 11 pgs.

"European Application Serial No. 21831014.2, Response to Communication pursuant to Rules 161(1) and 162 EPC filed Jan. 16, 2024", 53 pgs.

"International Application Serial No. PCT/EP2021/084662, International Preliminary Report on Patentability mailed Jul. 6, 2023", 13 pgs.

"European Application Serial No. 25198282.3, Extended European Search Report mailed Oct. 30, 2025", 14 pgs.

"Korean Application Serial No. 10-2023-7015745, Notice of Preliminary Rejection mailed Oct. 29, 2025", W English Translation, 7 pgs.

\* cited by examiner

X axis

Z axis

WAVEGUIDE FOR AUGMENTED REALITY OR VIRTUAL REALITY DISPLAY

CLAIM OF PRIORITY

This application is a U.S. national-phase application filed under 35 U.S.C. § 371 from International Application Serial No. PCT/EP2021/084662, filed on Dec. 7, 2021, and published as WO 2022/135918 on Jun. 30, 2022, which claims the benefit of priority to EP patent application No. 20216922.3, filed on Dec. 23, 2020, each of which are incorporated herein by reference in their entireties.

FIELD OF INVENTION

The present invention relates to a waveguide for use in an augmented reality or virtual reality display. In particular, the invention relates to a waveguide in which input light is expanded in two orthogonal directions in an output element and is coupled out of a waveguide towards a viewer. This can allow physical expansion of the eyebox in an augmented reality display.

BACKGROUND TO THE INVENTION

An augmented reality display allows a user to view their surroundings as well as projected images. In military or transportation applications the projected images can be overlaid on the real world perceived by the user. Other applications for these displays include video games and wearable devices, such as glasses.

In a normal augmented reality set-up a transparent display screen is provided in front of a user so that they can continue to see the physical world. The display screen is typically a glass waveguide, and a projector is provided to one side. Light from the projector is coupled into the waveguide by a diffraction grating. The projected light is totally internally reflected within the waveguide. The light is then coupled out of the waveguide by another diffraction grating so that it can be viewed by a user. The projector can provide information and/or images that augment a user's view of the physical world.

An optical device is disclosed in WO 2018/178626 for expanding input light in two dimensions in an augmented reality display. An input diffractive optical element is provided for coupling input light from a projector into a waveguide. The optical device also includes an output element having two diffractive optical elements overlaid on one another in the waveguide so that each of the two diffractive optical elements can receive light from the input diffractive optical element and couple it towards the other diffractive optical element in the pair, which can then act as an output diffractive optical element which couples light out of the waveguide towards a viewer. The two diffractive optical elements overlaid on one another are provided in a photonic crystal. This is achieved by having an array of pillars arranged within or on the surfaces the waveguide, having an increased refractive index relative to the surrounding waveguide medium. The pillars in WO 2018/178626 are described as having a plurality of substantially straight sides having respective normal vectors at different angles when viewed in the plane of the waveguide, from the perspective of a viewer.

This arrangement has been found to be very effective at simultaneously expanding light in two dimensions and coupling light out of the waveguide.

Advantageously this can improve the use of space on the waveguide which can decrease the cost of manufacture. This arrangement has also been found to be effective at mitigating the presence of a central strip in the output image which has a higher relative brightness than other parts.

An issue has been identified with known waveguides because a brightness gradient in the output image has been observed. This brightness gradient is undesirable for users, and an object of the present invention is to overcome and mitigate this issue.

SUMMARY OF INVENTION

According to an aspect of the invention, there is provided a waveguide for use in an augmented reality or virtual reality display, comprising: a plurality of optical structures in a photonic crystal; wherein the plurality of optical structures are arranged in an array to provide two diffractive optical elements overlaid on one another in or on the waveguide, wherein each of the two diffractive optical elements is configured to receive light from an input direction and couple it towards the other diffractive optical element which can then act as an output diffractive optical element, providing outcoupled orders towards a viewer; wherein the plurality of optical structures have different respective cross sectional shapes, for a cross section parallel to the plane of the waveguide, at different positions in the array in order to provide different diffraction efficiencies at different positions in the array, wherein at least one characteristic of the cross sectional shape of the plurality of optical structures is variable in the direction of a first axis which is parallel to the input direction; wherein the at least one characteristic is related to the cross sectional area of the optical structures, for a cross section parallel to the plane of the waveguide.

In this way, the diffraction efficiency of the photonic crystal can be controlled at different points in the array to achieve particular effects. In one example, this can provide improved uniformity of luminosity of output towards a viewer. By varying the diffraction efficiencies of the optical structures along the first axis, the uniformity of luminosity of the output light can be improved. In some examples, the diffraction efficiencies of the optical structures may increase along the first axis. In some examples, the diffraction efficiencies of the optical structures may be at a minimum at a portion of the array in which the light is received from the input direction.

Preferably, the at least one characteristic of the cross sectional shape of the plurality of optical structures is also variable in the direction of a second axis, which is perpendicular to the input direction. In this way, the diffraction efficiency of the photonic crystal can be controlled to achieve a wider variety of effects. In some examples, the diffraction efficiencies of the optical structures along the second axis may increase in a positive direction and in a negative direction, away from a central point, which is the point at which input light is received at the plurality of optical structures in the photonic crystal.

In some embodiments, the at least one characteristic of the cross sectional shape of the plurality of optical structures is variable, for a cross section parallel to the plane of the waveguide, according to a radial distance from a point at which light is received at the array from the input direction in order to provide different diffraction efficiencies at different radial distances. In this way, the uniformity of luminosity of the output light can be further improved. In one example, the optical structures in the array at the same radial distance may each have the same cross sectional shape, for a cross section parallel to the plane of the waveguide. This may further still improve the uniformity of luminosity of the output light.

In some embodiments, the array comprises a plurality of groups of optical structures, wherein the at least one characteristic of the cross sectional shape of the optical structures is variable between different groups. In this way, the diffraction efficiencies of optical structures can be varied in a discrete number of groups. In some examples, this can provide a photonic crystal which provides improved uniformity of luminosity of outcoupled light, but is also easier to design, optimise and/or manufacture. Preferably, the plurality of optical structures may be evenly spaced and regularly distributed amongst the plurality of groups in order to form a regular grid of groups on the array. Preferably, the regular grid may be a square grid. The grid may also be a hexagonal grid. Each optical structure in a group may have the same cross sectional shape, such that each group has an associated shape.

Preferably, the at least one characteristic of the cross sectional shape of the optical structures which is variable between different groups is variable, for a cross section parallel to the plane of the waveguide, according to a radial distance of the groups to a point at which light is received at the array from the input direction, in order to provide different diffraction efficiencies at different radial distances. In this way, the uniformity of luminosity of the output light can be further improved. In some examples, the region may correspond to a portion of the array which receives the light from the input direction. In one example, the groups at substantially the same distance from the region may each have the same associated shape, in the plane of the waveguide, or in other words for a cross section parallel to the plane of the waveguide. This may advantageously improve the uniformity of luminosity of the output light.

The at least one characteristic is related to the cross sectional area of the optical structures, for a cross section parallel to the plane of the waveguide. In this way, the diffraction efficiencies of the optical structures can be controlled precisely according to their area in the plane of the waveguide. It has been found that varying the area of the optical structures to control their diffraction efficiencies is a more reproducible technique than some other techniques used to control diffraction efficiencies, such as techniques involving applying a coating to the optical structures. The optical structures may nevertheless be geometrically similar to one another.

Preferably, the plurality of optical structures each have a ratio between a physical dimension of the optical structures and a regular spacing of the optical structures in the array, and wherein the at least one characteristic is related to the ratio. More preferably, the physical dimension corresponds to a straight side of the optical structure in the plane of the waveguide. In this way, the diffraction efficiencies of the optical structures can be controlled precisely according to the ratio. In some examples, altering the length of a straight side of the optical structures to control their diffraction efficiencies may improve the ease of manufacturing of the waveguide compared to varying other characteristics of the shape of the optical structures.

Preferably, the waveguide further comprises an input diffractive optical element configured to couple light into the waveguide and to provide light to the plurality of optical structures in the array in the input direction. The input diffractive optical element is preferably a diffraction grating comprising grooves in one surface of the waveguide. Preferably the input grating has a high efficiency for coupling light into the waveguide.

In some embodiments, the two diffractive optical elements are overlaid on one another in the waveguide and the optical structures exhibit differences in refractive index from a surrounding waveguide medium. In this way, the optical structures can be embedded within a waveguide and their diffractive properties can be created due to a difference in refractive index between the structures and the waveguide medium.

In some embodiments, the two diffractive optical elements are overlaid on one another on the waveguide and the optical structures are surface relief structures on a surface of the waveguide. In this way, the mismatch between the refractive index of the surface relief features and the air that surrounds them may provide the desired diffractive properties.

According to a second aspect of the invention, there is provided a method of manufacture of a waveguide for an augmented reality or virtual reality display, comprising the steps of: providing a plurality of optical structures in a photonic crystal; arranging the plurality of optical structures in an array to provide two diffractive optical elements overlaid on one another in or on the waveguide, wherein each of the two diffractive optical elements is configured to receive light from an input direction and couple it towards the other diffractive optical element which can then act as an output diffractive optical element, providing outcoupled orders towards a viewer; providing the plurality of optical structures with different respective cross sectional shapes, for a cross section parallel to the plane of the waveguide, at different positions in the array in order to provide different diffraction efficiencies at different positions in the array, wherein at least one characteristic of the cross sectional shape of the plurality of optical structures is variable in the direction of a first axis which is parallel to the input direction; wherein the at least one characteristic is related to the cross sectional area of the optical structures, for a cross section parallel to the plane of the waveguide.

DETAILED DESCRIPTION OF THE DRAWINGS

Figure 1:
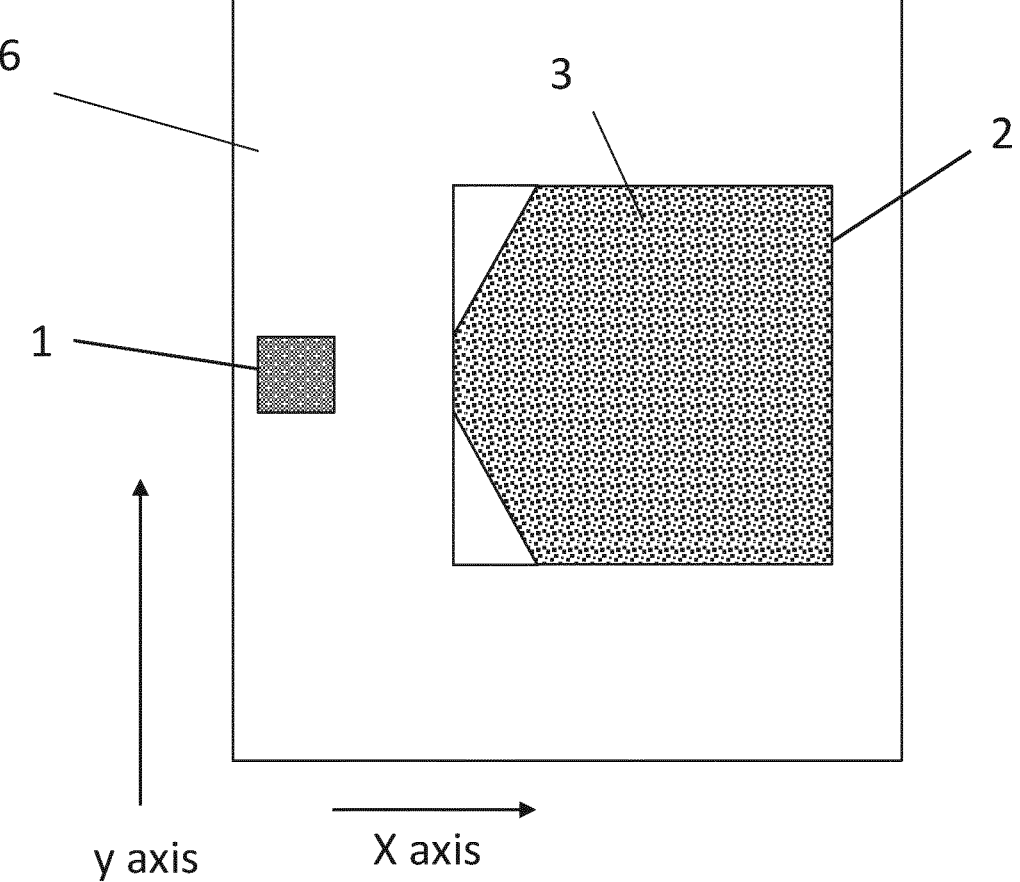
FIG. 1 is a top view of a known waveguide.

FIG. 1 is a top view of a known waveguide 6. An input diffraction grating 1 is provided on a surface of the waveguide 6 for coupling light from a projector (not shown) into the waveguide 6. Light that is coupled into the waveguide 6 travels by total internal reflection towards an output element 2 which includes a known photonic crystal 3. In this example the known photonic crystal 3 includes pillars (not shown) having a cross sectional shape comprising a plurality of straight sides from the top view perspective of FIG. 1, when viewed in the plane of the waveguide. The pillars have a different refractive index relative to the refractive index of the surrounding waveguide medium and they are arranged in an array having hexagonal symmetry.

When light encounters the known photonic crystal 3 in the output element 2 from the input diffraction grating 1 along the x-axis it is either transmitted towards a viewer or turned through ±60° in the x-y plane, by one of the diffractive optical structures formed by the array in the known photonic crystal 3. The light can also be diffracted into a zero order and continue to propagate through the waveguide 6 by total internal reflection and re-encounter the known photonic crystal 3 further along the x-axis.

Figure 2:
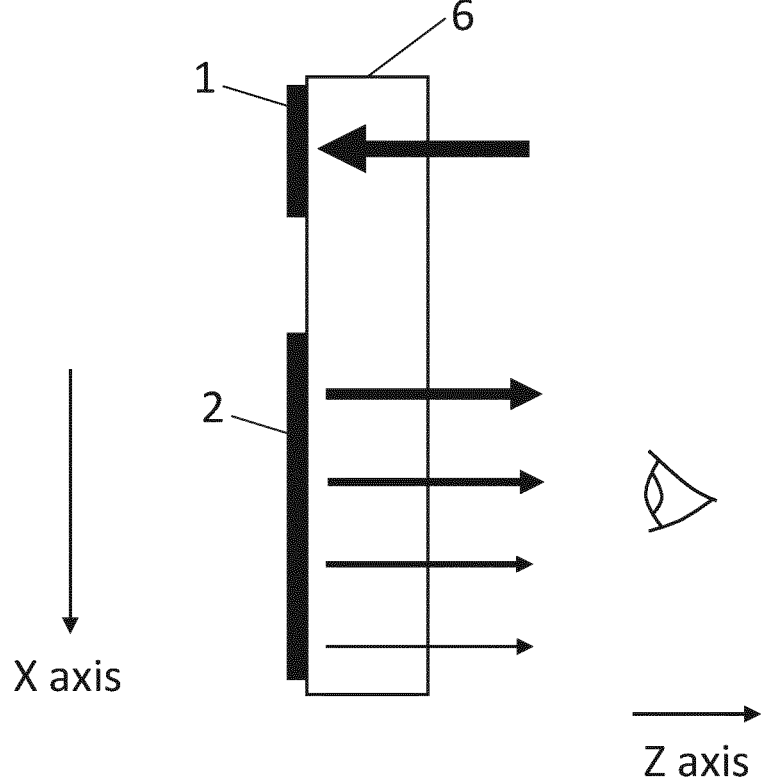
FIG. 2 is a side view of a known waveguide.

FIG. 2 is a side view of the known waveguide 6. The arrows show the light which is coupled into and out of the waveguide 6 by the input diffraction grating 1 and the output element 2, respectively. The light coupled out of the output element 2 forms an image which can be delivered to a viewer in augmented reality applications.

The relative brightness of the light is shown by the relative thickness of the arrows. As can be seen by the decreasing relative thickness of the arrows along the x-axis, the brightness of the output image can decrease along the direction of propagation. It is believed that this effect is created due to the diffraction efficiencies of the diffractive optical structures formed by the array in the known photonic crystal 3. In particular, it is believed that a significant proportion of light received from the input diffraction grating 1 is diffracted towards the eye when it encounters the known photonic crystal 3, rather than propagating through the waveguide 6 to be diffracted to the eye by a portion of the photonic crystal 3 further along the x-axis. This can cause a higher relative brightness at the portion of the output image which is produced by diffractions between the light and the known photonic crystal 3 which occur towards the negative end of the x-axis.

Figure 3:
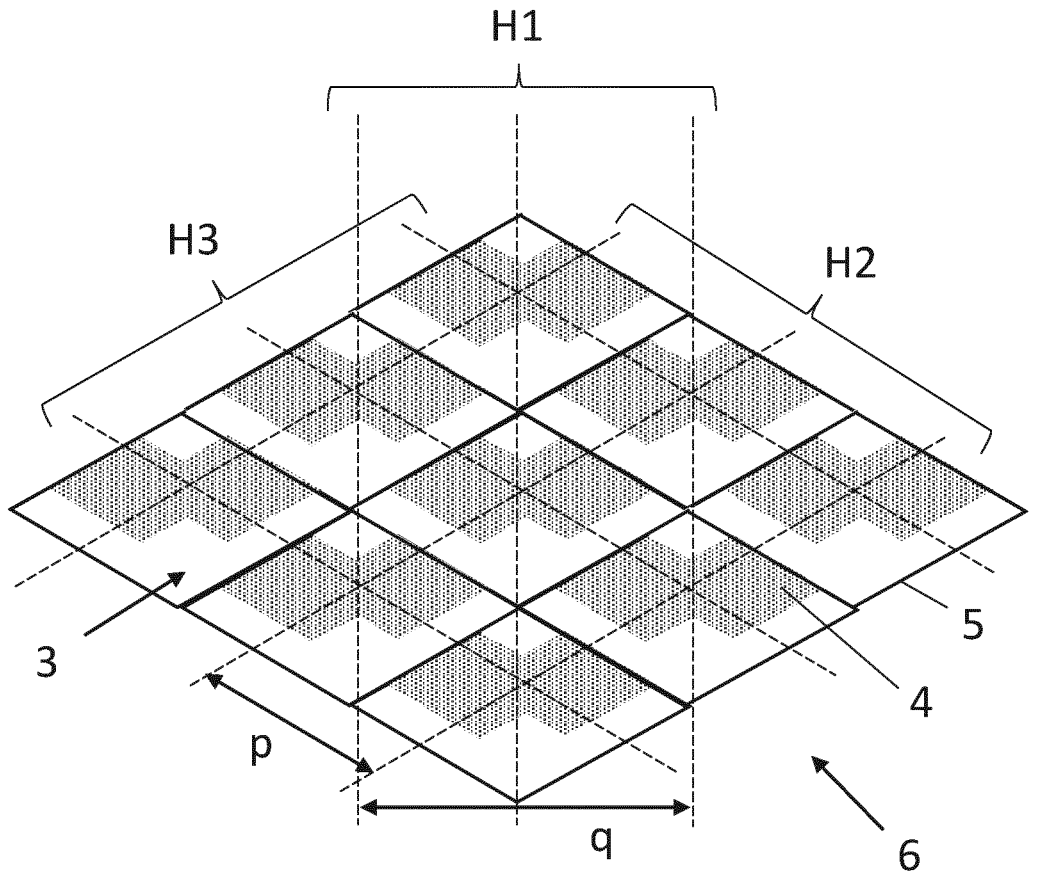
FIG. 3 is a top view of a part of a known photonic crystal for use in a known waveguide.
Figure 3:
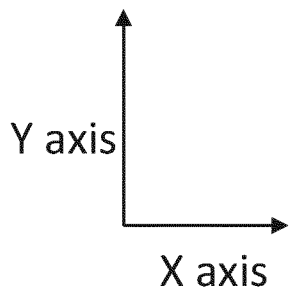
Figure 4A:
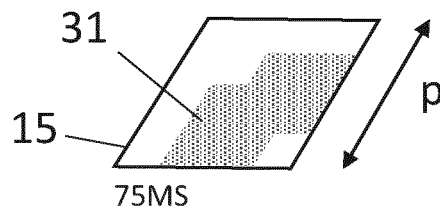
FIG. 4A shows an example of an optical structures that can be used in a photonic crystal in a waveguide in an embodiment of the invention.
Figure 4B:
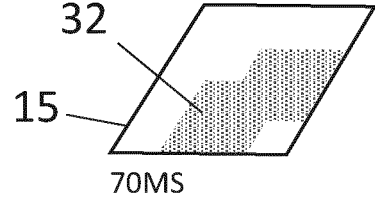
FIG. 4B shows another example of an optical structures that can be used in a photonic crystal in a waveguide in an embodiment of the invention.
Figure 4C:
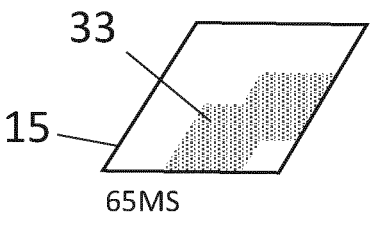
FIG. 4C shows another example of an optical structures that can be used in a photonic crystal in a waveguide in an embodiment of the invention.
Figure 4D:
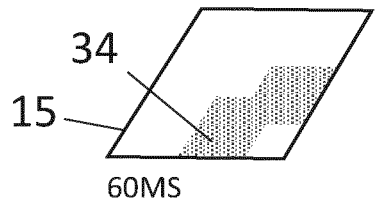
FIG. 4D shows another example of an optical structures that can be used in a photonic crystal in a waveguide in an embodiment of the invention.
Figure 4E:
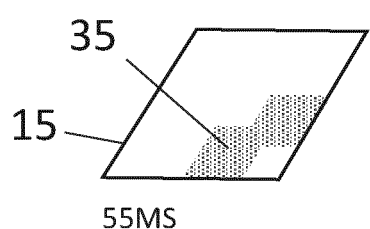
FIG. 4E shows another example of an optical structures that can be used in a photonic crystal in a waveguide in an embodiment of the invention.

FIG. 3 is a top view of a part of the known photonic crystal 3, which is an array of optical structures 4 that are provided within the waveguide 6. The waveguide 6 may have a low refractive index, with n~1.5. The optical structures 4 in this arrangement are polygons which can be considered as parallelograms with two rectangular inward notches. The optical structures 4 are shown within regularly sized larger parallelograms 5, which indicates the spacing of optical structures 4 within the known photonic crystal 3. The optical structures 4 have substantially the same cross-sectional shape along the length of the waveguide 6, i.e. along the direction of the x-axis, and thus occupy substantially the same area within their respective larger parallelograms 5.

In some known examples the optical structures 4 can be provided on one surface of the waveguide 6. In this arrangement the optical structures 4 can have a feature height so that they project from the surface of the waveguide 6. It has been found that an effective photonic crystal can be created with feature height in the range of 30 nm to 200 nm. Air channels are formed in the valleys between the optical structures 4. The optical structures 4 can have the same refractive index as the waveguide medium with n~1.5. The optical structures 4 are surrounded by air with a refractive index, n=1, and this mismatch in refractive index can allow diffraction.

In another known embodiment the optical structures 4 can be embedded within the waveguide 6 medium. The optical structures 4 can therefore be provided entirely within the waveguide 6 medium. This requires a refractive index mismatch between the optical structures 4 and the waveguide medium 6 in order for diffraction to occur. This can be achieved by creating a waveguide 6 having a surface relief profile with optical structures 4 on one surface. A bonding material can then be applied on the optical structures 4 and this can be bonded to a cover piece having the same refractive index as the waveguide 6. By choosing a bonding material that has a different (usually higher) refractive index than the waveguide medium 6 a unified waveguide 6 can be created between the original waveguide and the cover piece, with the bonding material sandwiched in between. In this example design the bonding material has the same shape as the optical structures 4, but a different refractive index from the surrounding waveguide medium.

The regular arrangement of optical structures 4 in the array may be thought of as a number of overlying effective diffraction gratings or diffractive optical structures. In particular it is possible to define a grating H1 with optical structures 4 aligned along the y-axis with adjacent rows of optical structures separated by a distance q. Grating H2 is arranged with rows of optical structures 4 at an angle of +30° to the x-axis, with adjacent rows separated by a distance p, known as the lattice constant. Finally, grating H3 is arranged with rows of optical structures 4 at an angle of −30° to the x-axis, with adjacent rows separated by a distance p. The values p and q are related to one another by the expression $q=2p \cos(30°)$. It has been found that an effective photonic crystal can be created with values of p in the range of 340 nm to 650 nm.

The optical structures 4 can be fully or partially formed by providing a first grating H3 overlying a second grating H2, such that the spaces or valleys in between the optical structures 4 of grating H3 intersect the optical structures 4 of grating H2, and vice versa. This arrangement produces a plurality of optical structures 4, which also form the H1 grating overlying the H2 and H3 gratings.

When light from an input grating received along the x-axis is incident on the known photonic crystal 3 it undergoes multiple simultaneous diffractions by the various diffractive optical elements. Light can be diffracted into a zero order, which is a continuation of the propagation of the incident light. Light can also be diffracted into a first diffraction order by grating H1. The first order is coupled out of the waveguide 6 in a positive direction along the z-axis, towards a viewer as shown in FIG. 2, which can be defined as the straight to eye order. Light can also be diffracted into a first diffracted order by the H2 diffractive optical structure. This first order is diffracted at +60° to the x-axis, and this light beam goes on to make further interactions with the known photonic crystal 3. Light can also be diffracted into a first diffracted order by the H3 diffractive optical structure. This first order is diffracted at −60° to the x-axis, and this light beam goes on to make further interactions with the known photonic crystal 3. A subsequent diffractive interaction with the H2 diffractive optical structure can couple light out of the waveguide 6 in the positive z-axis towards a viewer. Thus, light can be coupled out of the waveguide 6 at each point, and yet light can continue to expand within the waveguide 6 in two dimensions. The symmetry of the known photonic crystal 3 means that every exit beam has the same angular and chromatic properties as the input beam, which means that a polychromatic (as well as a monochromatic) light source may be used as the input beam with this photonic crystal arrangement.

The known photonic crystal 3 can allow simultaneous and rapid expansion of light in two dimensions so that the input light can fill a two-dimensional display screen. This can allow an ultra-compact display because the waveguide 6 size can be kept to a minimum due to the two-dimensional beam expansion.

In this arrangement the optical structures 4 have straight sides that are parallel to the diffractive optical structures H2, H3. Thus, the sides of the parallelograms are angled at ±30° to the x-axis, which is the direction along which input light is received from the input grating 1.

It has been found that the diffraction efficiency of different portions of the diffractive optical structures H1, H2, H3 can be controlled by changing the shape of the optical structures 4 within their respective parallelograms 5. This can increase or decrease the proportion of light that is diffracted into the zero order, depending on how the shape of the optical structures 4 is altered. In one example, it has been found that decreasing the size while maintaining the geometric shape of the optical structures located towards the negative end of the x-axis increases the proportion of light which is diffracted into the zero order by those optical structures. This has the effect that more light reaches the optical structures located towards the positive end of the x-axis before being diffracted towards the eye. This advantageously improves the uniformity of brightness in the output image and mitigates the brightness gradient which has been observed in the known waveguide 6.

FIGS. 4A to 4E shows a number of examples of optical structures 31, 32, 33, 34, 35 with different shapes that can be used in a photonic crystal in a waveguide in an embodiment of the invention. The optical structures 31, 32, 33, 34, 35 are shown within a regular parallelogram 15 which indicates the regular spacing p of the optical structures 31, 32, 33, 34, 35 when used in a photonic crystal. The upper and lower apexes of the parallelogram 15 have 120° angles. The lattice constant, p, is equal to the length of one of the sides of the larger parallelogram 15. The top view of the image shows the optical structures 31, 32, 33, 34, 35 as would be viewed in the plane of the waveguide when provided in a photonic crystal. It can be seen that the optical structures 31, 32, 33, 34, 35 each occupy decreasing projected areas within their respective parallelograms 15, in the plane of the waveguide, while maintaining geometrically similar shapes. This gives rise to a decreasing diffraction efficiency between each of the optical structures 31, 32, 33, 34, 35. It can be useful to define a "Mark to Space", or "MS", ratio for each of the optical structures 31, 32, 33, 34, 35 according to a ratio of their respective projected areas to the area of the regular parallelogram 15. The Mark to Space ratio can be a useful metric for discussing the diffraction efficiency of a given optical structure. The optical structures 31, 32, 33, 34, 35 have Mark to Space ratios of 75, 70, 65, 60, and 55, respectively. The diffraction efficiency of the optical structures 31, 32, 33, 34, 35 increases or decreases with increasing or decreasing Mark to Space ratio.

In FIGS. 4A to 4E, the optical structures 31, 32, 33, 34, 35 have similar geometric shapes, but varying diffraction efficiencies due to their difference in sizes. In other examples, the diffraction efficiencies of the optical structures 31, 32, 33, 34, 35 may be altered by changing the geometric shapes, or outline, as viewed in the plane of the waveguide, alternatively or in addition to varying the size of the shapes within the regular parallelogram 15. If the projected area of the optical structures 31, 32, 33, 34, 35 is kept constant within the regular parallelogram 15 while the geometric shape is altered, then their diffraction efficiencies would change but their Mark to Space ratios would not vary. It is envisaged that in other example embodiments the diffraction efficiencies of the optical structures 31, 32, 33, 34, 35 may be varied while maintaining a constant Mark to Space ratio.

Figure 5:
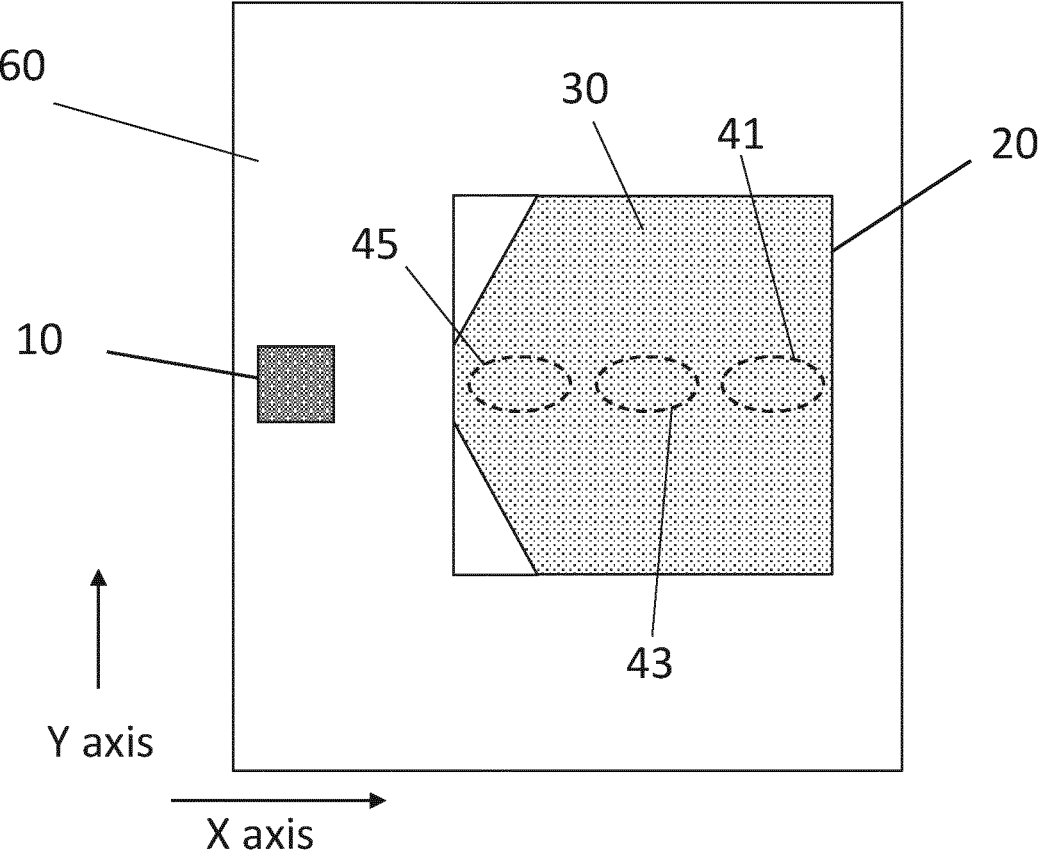
FIG. 5 is a top view of a photonic crystal for use in a waveguide in a first embodiment of the invention.

FIG. 5 is a top view of a waveguide according to a first embodiment of the invention. An input diffraction grating 10 is provided on a surface of a waveguide 60 for coupling light into the waveguide 60 from a projector (not shown). Light that is coupled into the waveguide 60 travels along the x-axis by total internal reflection towards an output element 20 which includes a first photonic crystal 30. In this example, the first photonic crystal 30 is identical to the known photonic crystal 3 except that the array of optical structures which forms the first photonic crystal 30 comprises a mixture of the optical structures 31, 33, 35 of FIGS. 4A, 4C, and 4E. Like the known photonic crystal 3, the optical structures of the first photonic crystal 30 may be thought of as three overlying effective diffraction gratings which diffract light into the zero order, one of the first orders, or into the straight to eye order.

A first region 45 of the first photonic crystal 30 is highlighted in FIG. 5. In the first region 45, the array which forms the first photonic crystal 30 comprises a plurality of the optical structure 35 of FIG. 4E which has a Mark to Space ratio of 55. A second region 43 is highlighted wherein the array comprises a plurality of the optical structure 33 of FIG. 4C which has a Mark to Space ratio of 65. A third region 41 is highlighted wherein the array comprises a plurality of the optical structure 31 of FIG. 4A which has a Mark to Space ratio of 75. With respect to the x-axis, the second region 43, sits after the first region 45 and before the third region 41. The optical structures in the array outside of the highlighted regions may be identical to the optical structure 35 of FIG. 4E.

When light from the input diffraction grating 10 encounters the first photonic crystal 30, the light first encounters the first region 45. Some of the light which encounters the first region 45 is diffracted into the straight to eye order along the z-axis, and some of the light is diffracted into the zero order along the x-axis. Some of the light is also diffracted into a first order and is turned by ±60° in the x-y plane. The light which was diffracted into the zero order next encounters the second region 43. A lower intensity of light is incident on the second region 43 from the first region 45 because some of the light which was incident on the first region 45 was diffracted into the straight to eye order, or was turned by ±60° away from the second region 43. However, the Mark to Space ratio of the optical structures in the second region 43 is greater than in the first region 45, and so a greater proportion of light which encounters the second region 43 is diffracted into the straight to eye order. In this way, the difference in intensities which are incident on the first region 45 and the second regions 43 can be compensated, thus enabling the first region 45 and the second region 43 to diffract similar intensities of light into the straight to eye order. This mitigates the observed brightness gradient in the output image.

The same effect occurs between the second region 43 and the third region 41. Some of the light which was diffracted into the zero order by the second region 43 next encounters the third region 41. A lower intensity of light is incident on the third region 41 from the second region 43 because some of the light which was incident on the second region 43 was diffracted into the straight to eye order, or was turned by ±60°. However, the Mark to Space ratio of the optical structures in the third region 41 is greater than in the second region 43, and so a greater proportion of light which encounters the third region 41 is diffracted into the straight to eye order. Thus, the difference in intensities which are incident on the second region 43 and the third region 41 can be compensated, enabling the second region 43 and the third region 41 to diffract similar intensities of light into the straight to eye order. In this way, the first region 45, the second region 43 and the third region 41 can outcouple similar intensities of light out of the waveguide 60. The first photonic crystal 30 can thus provide a more uniform output image. In particular, the parts of the image which originate from straight to eye diffractions with the first region 45, the second region 43 and the third region 41 are more uniform with respect to one another. The uniformity of the output image can be further improved by altering the Mark to Space ratio of the optical structures across the entire array, and altering them more gradually, as is described below with reference to further embodiments.

Figure 6:
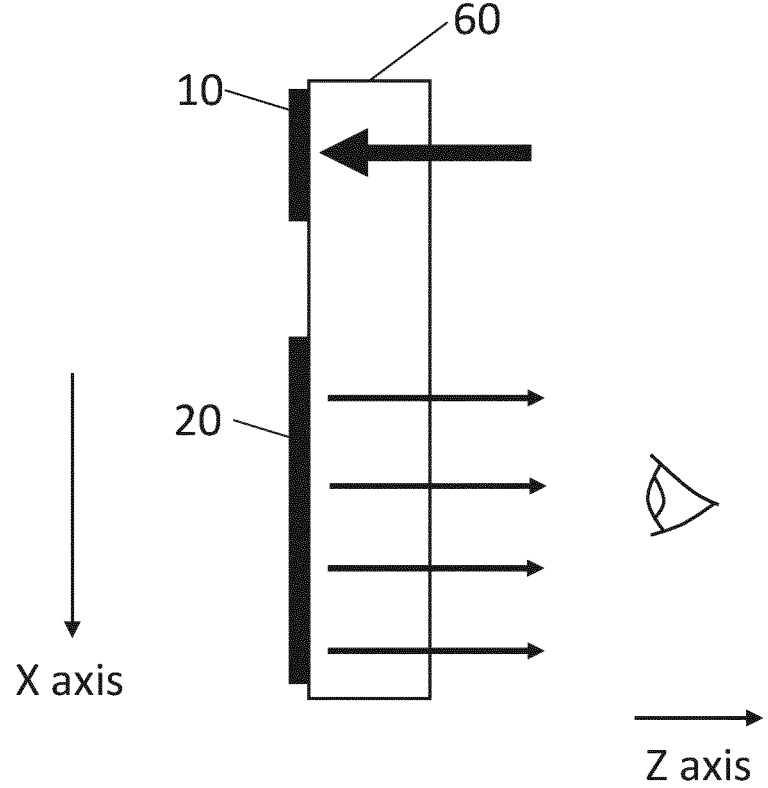
FIG. 6 is a side view of the first embodiment of the invention.

FIG. 6 shows a side view of the waveguide 60. The arrows show the light which is coupled into and out of the waveguide 60 by the input diffraction grating 10 and the output element 20, respectively. The light coupled out of the output element 20 forms an image which can be delivered to a viewer in augmented reality applications. The relative brightness of the light is shown by the relative thickness of the arrows. As can be seen with respect to FIG. 2, the luminosity of the outcoupled light is more uniformly distributed along the x-axis in comparison to the known waveguide 6 of FIG. 2. This can be attributed to the altered diffraction efficiencies of the diffractive optical structures of the first photonic crystal 30.

Figure 7:
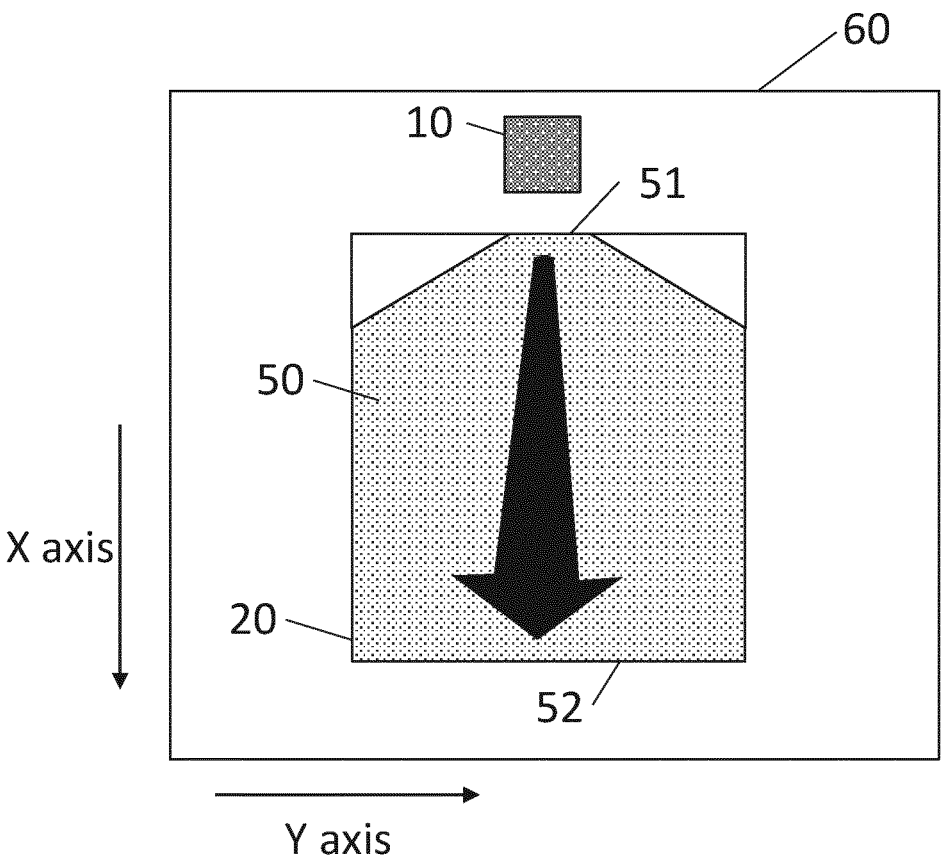
FIG. 7 is a top view of a photonic crystal for use in a waveguide in a second embodiment of the invention.

FIG. 7 shows a top view of a waveguide 60 according to a second embodiment of the invention. As was described with reference to FIG. 5, an input diffraction grating 10 is provided on a surface of a waveguide 60 for coupling light into the waveguide 60 from a projector (not shown). Light that is coupled into the waveguide 60 travels along the x-axis by total internal reflection towards an output element 20 which includes a second photonic crystal 50. The second photonic crystal 50 varies from the first photonic crystal 30 in that the Mark to Space ratios of the optical structures in the second photonic crystal 50 increase continuously along the direction of the x-axis. It should be noted that it is considered that any practical application would implement discrete changes in Mark to Space ratio, to some degree. In FIG. 7, the thickness of the arrow overlaid on the second photonic crystal 50 graphically represents the increasing Mark to Space ratio, or equivalently in this example increasing size, of the optical structures in the array at different points along the x-axis. In one example, the Mark to Space ratio of the optical structures may increase continuously from 55 (MS) at a first side 51 of the second photonic crystal 50 which first receives the light incident from the input diffraction grating 10, to 75 (MS) at a second side 52 of the second photonic crystal 50 which is distant to the first side 51 in the direction which the light propagates through the second photonic crystal 50. In other embodiments where the light from the input diffraction grating 10 couples the light towards the first photonic crystal 50 along an axis at an angle to the x-axis, the Mark to Space ratio of the optical structures may increase in the direction of the axis.

By providing an array in which the optical structures have continuously varying Mark to Space ratios, the uniformity of the output image can be further improved with respect to the embodiment of FIG. 5. In the first photonic crystal 30, the increased Mark to Space ratio of the optical structures in the second region 43 with respect to the first region 45 enabled the second region 43 to diffract more light into the straight to eye order—thus counteracting the drop in intensity the second region 43 received from the first region 45. In the embodiment of FIG. 7, a similar effect is achieved between each consecutive optical structure along the direction of the x-axis. However, because the Mark to Space ratio is increased more gradually along the length of the second photonic crystal 50, the uniformity of the output image is further improved with respect to the embodiment of FIG. 5.

In the example embodiment of FIG. 7, the optical structures in the array which are at the same y-coordinate may have the same Mark to Space ratio. In some example embodiments, the Mark to Space ratio of optical structures may increase linearly along the direction of the x-axis. In other examples, the Mark to Space ratios of the optical structures may increase exponentially or monotonically.

Figure 8:
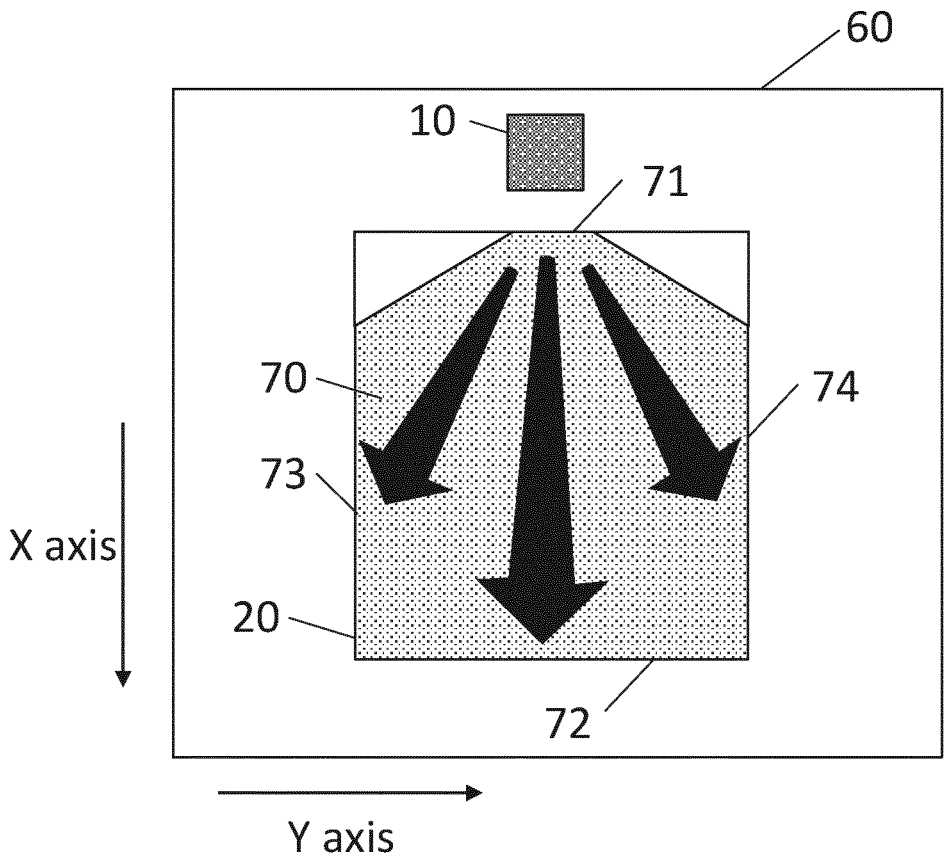
FIG. 8 is a top view of a photonic crystal for use in a waveguide in a third embodiment of the invention.

FIG. 8 shows a top view of a waveguide 60 according to a third embodiment of the invention. As described with reference to FIGS. 5 and 7, an input diffraction grating 10 is provided on a surface of a waveguide 60 for coupling light into the waveguide 60 from a projector (not shown). Light that is coupled into the waveguide 60 travels along the x-axis by total internal reflection towards an output element 20 which includes a third photonic crystal 70. The third photonic crystal 70 varies from the second photonic crystal 50 in that the Mark to Space ratio of the optical structures in the third photonic crystal 70 also vary along the direction of the y-axis. In FIG. 8, the thickness of the arrows overlaid on the third photonic crystal 70 graphically represents the increasing Mark to Space ratio of the optical structures in the array at different points along the x and y axes. The Mark to Space ratio of the optical structures increases according to their position along the x-axis from a first side 71 to a second side 72 of the photonic crystal 70.

In this embodiment, the Mark to Space ratio of the optical structures also varies with respect to the y-axis. In one example, the Mark to Space ratio of the optical structures may increase towards a third side 73 and a fourth side 74 of the third photonic crystal 70, but decrease towards a central axis which is parallel to the x-axis. The central axis may correspond to the axis along which light is coupled towards the third photonic crystal 70 from the input diffraction grating 10. The Mark to Space ratio of the optical structures may increase linearly in a positive direction and in a negative direction from the central axis. Alternatively, the increase may be an exponential increase or a monotonic increase.

When light from the input diffraction grating 10 encounters the third photonic crystal 70, some of the light is diffracted into a first order by one of the H2 or H3 gratings and is turned by ±60°. The turned light continues to propagate in either the positive or negative y-direction as well as the positive x-direction. A lower intensity of light can be incident on the third side 73 and the fourth side 74 of the third photonic crystal 70, compared to the central axis, because a portion of the turned light is diffracted into the straight to eye order before it reaches the third side 73 or the fourth side 74. Thus, the third side 73 and the fourth side 74 can outcouple a lower intensity of light compared to the central axis. This can create a brightness gradient in the output image if this effect is not mitigated. However, in the third photonic crystal 70 the Mark to Space ratio of the optical structures increases towards third side 73 and the fourth side 74 and so a greater proportion of light which encounters the optical structures towards the third side 73 and the fourth side 74 is diffracted into the straight to eye order. In this way, the difference in intensities which are incident on the third side 73 and the fourth side 74 compared to the central axis can be compensated, thus enabling the optical structures near the third side 73 and the fourth side 74 to diffract similar intensities of light into the straight to eye order compared to the optical structures in the central axis. This mitigates the observed brightness gradient in the output image between parts of the image produced by diffractions with the third side 73 and the fourth side 74 of the third photonic crystal 70. Thus, by continuously and gradually varying the Mark to Space ratio of the optical structures across both the x and y axes of the third photonic crystal 70, an improved uniformity of luminosity along both axes of the output image can be achieved.

In a further example, the Mark to Space ratio of the optical structures may vary according to the radial distance of the optical structures to the region of the third photonic crystal 70 which first receives the light from the input diffraction grating 10. In the example of FIG. 8, this region substantially corresponds to the first side 71 of the third photonic crystal 70. It has been found that such a configuration is a particularly effective way of varying the diffraction efficiencies of the optical structures in the array in order to achieve a more uniform output luminosity. A person skilled in the art would appreciate that in other examples, the light may be received at a different region in the array from an alternative input direction. In such an example, the Mark to Space ratio of the optical structures may increase with increasing distance from said different region.

Figure 9:
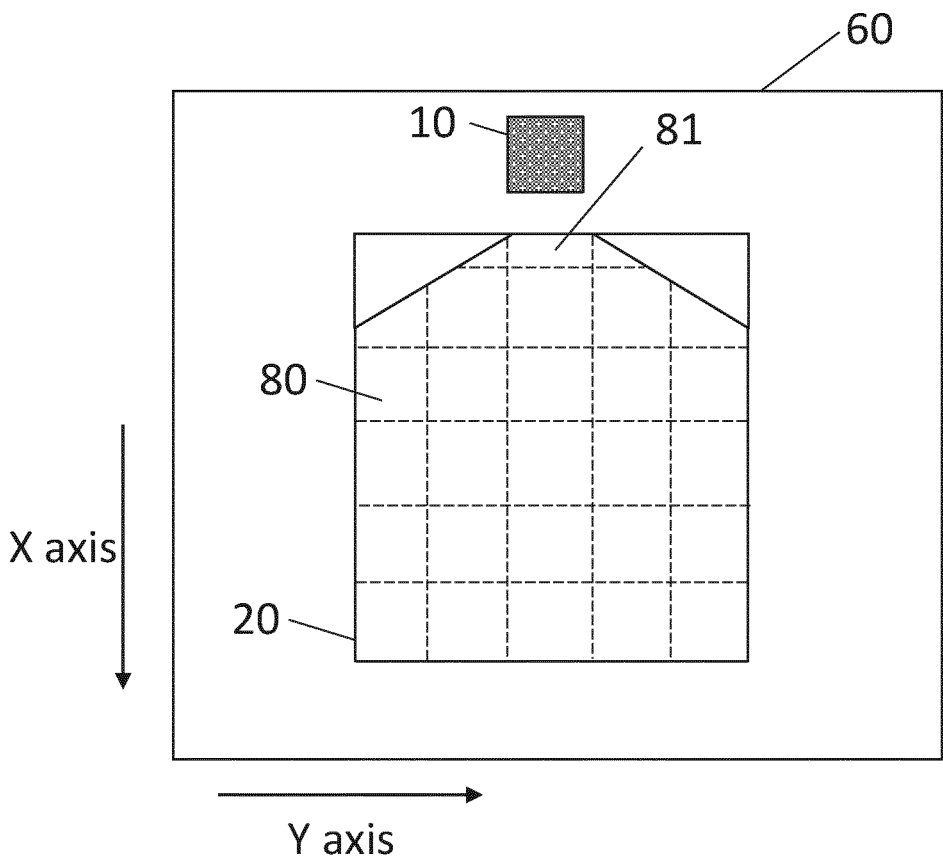
FIG. 9 is a top view of a photonic crystal for use in a waveguide in a fourth embodiment of the invention.

FIG. 9 shows a top view of a waveguide 60 according to a fourth embodiment of the invention. As described with reference to FIGS. 5 to 8, an input diffraction grating 10 is provided on a surface of a waveguide 60 for coupling light into the waveguide 60 from a projector (not shown). Light that is coupled into the waveguide 60 travels along the x-axis by total internal reflection towards an output element 20 which includes a fourth photonic crystal 80. Like the third photonic crystal 70, the optical structures of the fourth photonic crystal 80 have Mark to Space ratios which vary along the x and y axes of the array. However, the optical structures in the array are arranged in a regular grid of groups of optical structures. The groups are depicted in FIG. 9 as regions of the fourth photonic crystal 80 partitioned by dashed gridlines. Each group comprises a plurality of adjacent optical structures with the same diffraction efficiency. In the example of FIG. 9, the optical structures within each group each have the same Mark to Space ratio and the same geometric shape, and thus they also have the same diffraction efficiency. In this way, each group has an associated Mark to Space ratio. The Mark to Space ratio can be varied from group to group in the direction of the x and y axes in a similar manner to the previous photonic crystals, in order to provide a photonic crystal which provides a more uniform luminosity of outcoupled light. However, because the optical structures in the fourth photonic crystal 80 are bundled into groups of the same geometric size and shape, the fourth photonic crystal 80 can be easier to design, manufacture and optimise.

In one example, the Mark to Space ratio associated with each group may increase proportionately with the position of the groups along the x-axis. Alternatively, the increase can be exponential, linear or monotonic. Alternatively or in addition, the Mark to Space ratio associated with each group may increase in a positive direction and in a negative direction along the y axis, away from a central axis. In one example, the central axis may correspond to the axis along which light is coupled towards the fourth photonic crystal 80 from the input diffraction grating 10. In another example, the Mark to Space ratio of each group may increase according to the radial distance of each group to a first group 81 which is the group in the fourth photonic crystal 80 which first receives light from the input diffraction grating 10. Such an example may be a particularly effective at improving the uniformity of the output image produced by the fourth photonic crystal 80.

In the embodiments according to FIGS. 5 to 9, the diffraction efficiencies of the optical structures which make up the photonic crystals are varied by altering the sizes of the optical structures in order to achieve different Mark to Space ratios. As described previously, the diffraction efficiencies may be altered using alternative methods, such as by varying the geometric shape of the optical structures, or by varying the shape without altering the projected area of the optical structures, in the plane of the waveguide. It is envisaged that in other example embodiments the diffraction efficiencies of the optical structures of the first, second, third, and fourth photonic crystals 30, 50, 70, 80 may be altered in any of these alternative methods to achieve a similar result.

It has been found that altering the shape of the optical structures which make up a photonic crystal is a more reproducible way of altering the diffraction efficiencies compared to other known methods, such as through applying coatings to the optical structures of varying thicknesses.

Figure 10:
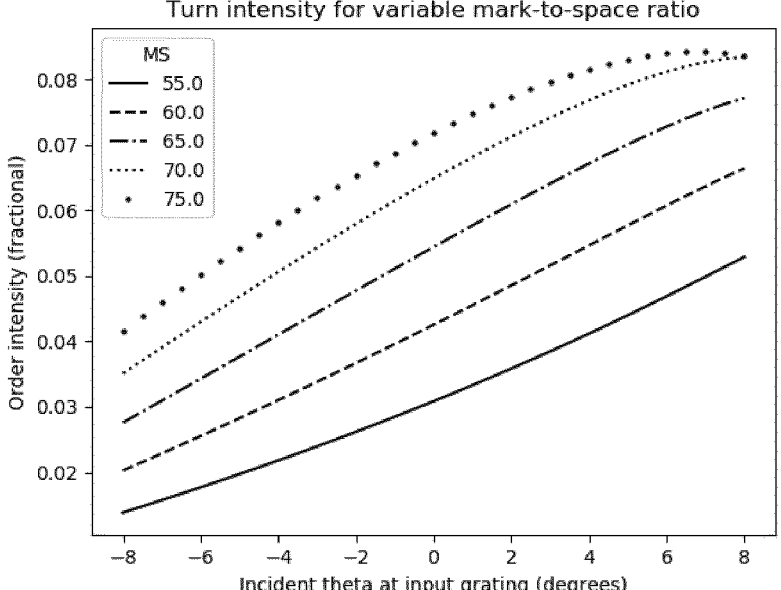
FIG. 10 is a graph showing the fractional intensity of light which is diffracted into one of the first orders when it interacts with a photonic crystal formed by an array of one of the optical structures of FIGS. 4A to 4E.

FIG. 10 is a graph showing the fractional intensity of light which is diffracted into one of the first orders when it interacts with a photonic crystal formed by an array of one of the optical structures of FIGS. 4A to 4E. The fractional intensity of light which is diffracted into one of the first orders by one of the H2 or H3 diffractive elements and turned by ±60° is plotted against the incident angle of the light on an input diffraction grating. The successive plot lines show how the fractional intensity increases with increasing Mark to Space ratio. Thus FIG. 10 shows how increasing the Mark to Space ratio of the optical structures increases the proportion of light which is diffracted into one of the first orders.

Figure 11:
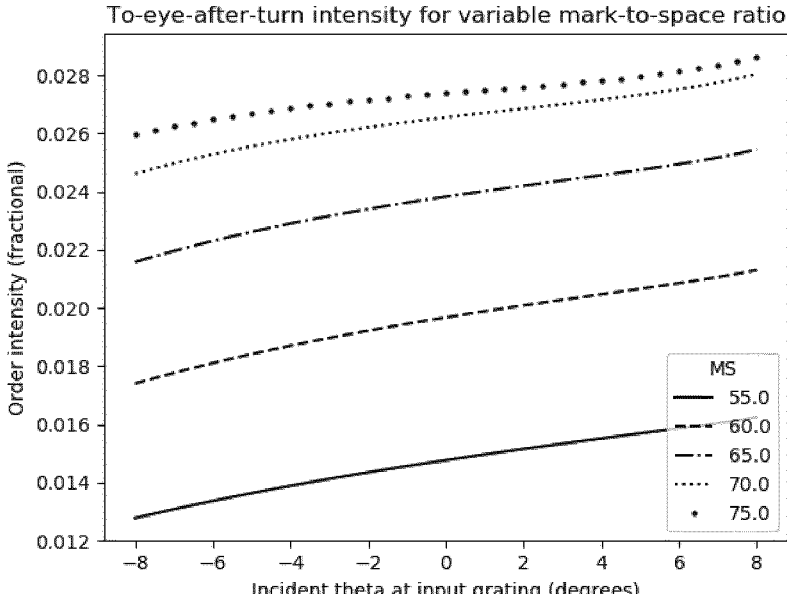
FIG. 11 is a graph showing the fractional intensity of light which is diffracted into the straight to eye order when it interacts with a photonic crystal formed by an array of one of the optical structures of FIGS. 4A to 4E.

FIG. 11 is a graph showing the fractional intensity of light which is diffracted into the straight to eye order when it interacts with a photonic crystal formed by an array of one of the optical structures of FIGS. 4A to 4E. The fractional intensity of light which is diffracted into the straight to eye order by the H1 diffractive element is plotted against the incident angle of the light on an input diffraction grating. The successive plot lines show how the fractional intensity increases with increasing Mark to Space ratio. It is evident from FIG. 11 that effective enhancement of light that is coupled into the straight to eye order can be achieved through the use of optical structures which have increased Mark to Space ratios.

The invention claimed is:

1. A waveguide for use in an augmented reality or virtual reality display, comprising:
   a plurality of optical structures in a photonic crystal;
   wherein the plurality of optical structures are arranged in an array to provide two diffractive optical elements overlaid on one another in or on the waveguide, wherein each of the two diffractive optical elements is configured to receive light from an input direction and couple it towards the other diffractive optical element which can then act as an output diffractive optical element, providing outcoupled orders towards a viewer;
   wherein the plurality of optical structures have different respective cross sectional areas, for a cross section parallel to a plane of the waveguide, at different positions in the array in order to provide different diffraction efficiencies at different positions in the array, wherein the respective cross sectional areas of the plurality of optical structures are variable in the direction of a first axis which is parallel to the input direction,
   wherein each of the plurality of optical structures is a parallelogram shaped optical structure that includes a first notch at a first side of the parallelogram shaped optical structure and a second notch at a second side of the parallelogram shaped optical structure.

2. The waveguide of claim 1, wherein the respective cross sectional areas of the plurality of optical structures are also variable in the direction of a second axis, which is perpendicular to the input direction.

3. The waveguide of claim 2, wherein the respective cross sectional areas of the plurality of optical structures are variable, for a cross section parallel to the plane of the waveguide, according to a radial distance from a point at which light is received at the array from the input direction in order to provide different diffraction efficiencies at different radial distances.

4. The waveguide of claim 2, wherein the array comprises a plurality of groups of optical structures, wherein the respective cross sectional areas of the optical structures are variable between different groups.

5. The waveguide of claim 4, wherein the respective cross sectional areas of the optical structures which are variable between different groups are variable, for a cross section parallel to the plane of the waveguide, according to a radial distance of the groups to a point at which light is received at the array from the input direction in order to provide different diffraction efficiencies at different radial distances.

6. The waveguide of claim 1, wherein the plurality of optical structures each have a ratio between a physical dimension of the plurality of optical structures and a regular spacing of the plurality of optical structures in the array, and wherein each of the respective cross sectional areas is related to the respective ratio.

7. The waveguide of claim 6, wherein the physical dimension corresponds to a straight side of the optical structure.

8. The waveguide of claim 1, further comprising an input diffractive optical element configured to couple light into the waveguide and to provide light to the plurality of optical structures in the array in the input direction.

9. The waveguide of claim 1, wherein the two diffractive optical elements are overlaid on one another in the waveguide and the plurality of optical structures exhibit differences in refractive index from a surrounding waveguide medium.

10. The waveguide of claim 1, wherein the two diffractive optical elements are overlaid on one another on the waveguide, and the optical structures are surface relief structures on a surface of the waveguide.

11. A method of manufacture of a waveguide for an augmented reality or virtual reality display, comprising steps of:
   providing a plurality of optical structures in a photonic crystal;
   arranging the plurality of optical structures in an array to provide two diffractive optical elements overlaid on one another in or on the waveguide, wherein each of the two diffractive optical elements is configured to receive light from an input direction and couple it towards the other diffractive optical element which can then act as an output diffractive optical element, providing outcoupled orders towards a viewer; and
   providing the plurality of optical structures with different respective cross sectional areas, for a cross section parallel to a plane of the waveguide, at different positions in the array in order to provide different diffraction efficiencies at different positions in the array, wherein the respective cross sectional areas of the plurality of optical structures are variable in the direction of a first axis which is parallel to the input direction,
   wherein each of the plurality of optical structures is a parallelogram shaped optical structure that includes a first notch at a first side of the parallelogram shaped optical structure and a second notch at a second side of the parallelogram shaped optical structure.

12. The method of claim 11, wherein the respective cross sectional areas of the plurality of optical structures are also variable in the direction of a second axis, which is perpendicular to the input direction.

13. The method of claim 12, wherein the respective cross sectional areas of the plurality of optical structures are variable, for a cross section parallel to the plane of the waveguide, according to a radial distance from a point at which light is received at the array from the input direction in order to provide different diffraction efficiencies at different radial distances.

14. The method of claim 12, wherein the array comprises a plurality of groups of optical structures, wherein the respective cross sectional areas of the optical structures are variable between different groups.

15. The method of claim 14, wherein the respective cross sectional areas of the optical structures which are variable between different groups are variable, for a cross section parallel to the plane of the waveguide, according to a radial distance of the groups to a point at which light is received at the array from the input direction in order to provide different diffraction efficiencies at different radial distances.

16. The method of claim 11, wherein the plurality of optical structures each have a ratio between a physical dimension of the plurality of optical structures and a regular spacing of the plurality of optical structures in the array, and wherein each of the respective cross sectional areas is related to the respective ratio.

17. The method of claim 16, wherein the physical dimension corresponds to a straight side of the optical structure.

18. The method of claim 11, wherein the waveguide further comprises an input diffractive optical element configured to couple light into the waveguide and to provide light to the plurality of optical structures in the array in the input direction.

19. The method of claim 11, wherein the two diffractive optical elements are overlaid on one another in the waveguide and the plurality of optical structures exhibit differences in refractive index from a surrounding waveguide medium.

20. The method of claim 11, wherein the two diffractive optical elements are overlaid on one another on the waveguide, and the optical structures are surface relief structures on a surface of the waveguide.

* * * * *